United States Patent [19]

Rowe

[11] 4,394,681
[45] Jul. 19, 1983

[54] OPTICAL SYSTEM FOR PROJECTION TELEVISION

[75] Inventor: William A. Rowe, Palatine, Ill.

[73] Assignee: Zenith Radio Corporation, Glenview, Ill.

[21] Appl. No.: 258,206

[22] Filed: Apr. 27, 1981

[51] Int. Cl.³ .............................................. H04N 9/31
[52] U.S. Cl. ..................................... 358/60; 358/237; 358/254
[58] Field of Search .................. 358/60, 63, 231, 237, 358/238, 239, 254

[56] References Cited

U.S. PATENT DOCUMENTS

| | | | |
|---|---|---|---|
| 2,476,494 | 7/1949 | Jones | 358/254 |
| 2,494,364 | 1/1950 | Shaw | 358/254 |
| 2,874,211 | 2/1959 | Burr | 358/60 |
| 3,115,544 | 12/1963 | Marley | 358/60 |
| 4,257,694 | 3/1981 | Reinhard | 353/78 |

*Primary Examiner*—Michael A. Masinick

[57] ABSTRACT

A projection optical system is disclosed that is protractible and retractible within a narrow spatial column for emerging from and nesting in a cabinet of an ultra-compact, rear-projection television receiver. The system comprises in combination a stationary optical assembly permanently enclosed in a lower portion of the cabinet and having image projection means and first mirror means. A protractible optical assembly is elevatable as a unit from the cabinet; the assembly includes a mirror and a rear projection screen. The mirror and screen are at angles effective to reflect and receive, respectively, an aerial image of the television image formed by the image projection means of the stationary optical assembly. The angles are also effective for nesting the mirror and the screen with components of the stationary optical assembly. The optical system, when retracted and nested is overall depth-wise-shallow and the receiver is as compact as a conventional, large-screen console television receiver. When the system is protracted within the narrow spatial column the receiver remains depth-wise-shallow, yet it is capable of displaying an image with an area greater than three times the image area of the conventional, large-screen console television receiver.

9 Claims, 16 Drawing Figures

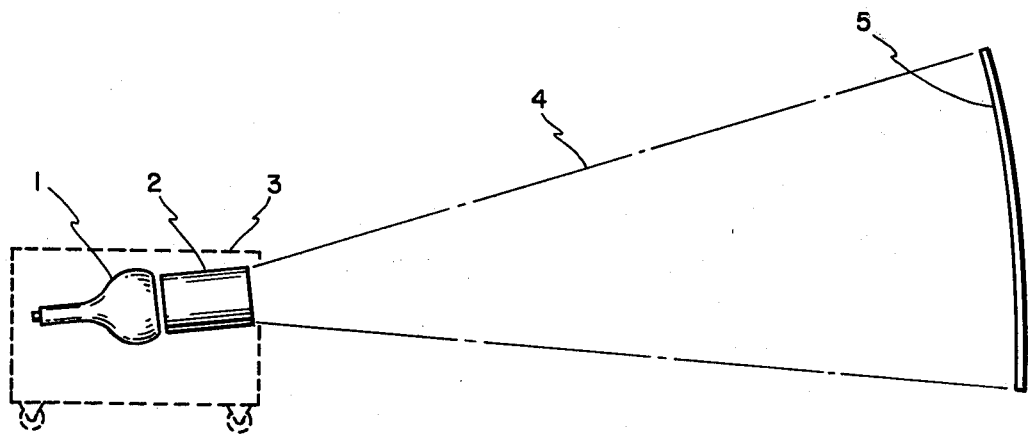
PRIOR ART  *Fig. 1*
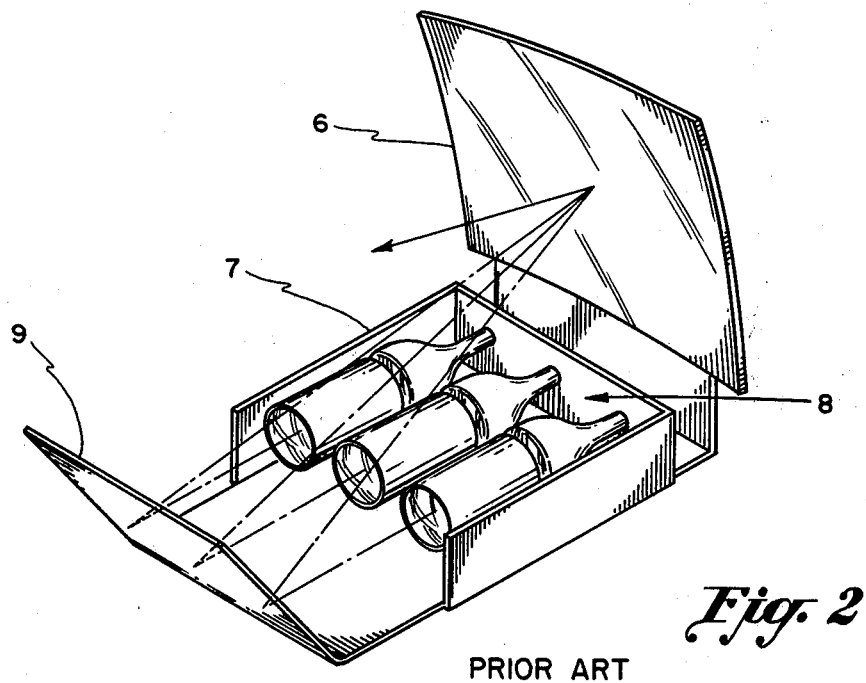
*Fig. 2*
PRIOR ART

OPTICAL SYSTEM FOR PROJECTION TELEVISION

CROSS-REFERENCE TO RELATED APPLICATIONS

This application is related to but in no way dependent upon copending applications of common ownership herewith including: Ser. No. 228,434 filed Jan. 26, 1981; Ser. No. 314,591 filed Oct. 26, 1981; Ser. No. 238,861 filed Feb. 27, 1981; Ser. No. 235,059 filed Feb. 17, 1981; Ser. No. 110,413 filed Jan. 7, 1980.

BACKGROUND OF THE INVENTION AND PRIOR ART DISCLOSURES

This invention concerns projection television systems, and is particularly directed to system in which a rear projection screen, storable in the system cabinet, is elevatable for viewing.

A jack-in-the-box projection television receiver comprises cabinet means for enclosing the components of the receiver, and includes lid means hinged at the back of the cabinet. The receiver comprises vertically arranged, elevatable rear projection screen means selectively storable in the cabinet. Image source means provides for forming a television image. Stationary projection means provide for projecting an aerial image of a television image formed by the image source means along a folded optical path onto the screen means when the optical path is erected and the screen means is located a predetermined image projection distance from the source means. The receiver further includes means for elevating the screen from a first receiver-inoperable position wherein the screen means is completely enclosed within the cabinet and the receiver is ultra-compact, to an elevated receiver-operable position wherein the screen means is emerged from the cabinet. As a result, the optical path is extended to a length equal to the predetermined image projection distance whereby the projection image is coincident with the screen.

The overall size and configuration of a projection television system is dictated primarily by its optical system. The optical system comprises the means for forming a television image and projecting an aerial image of the television image along an optical path onto a viewing screen. The screen may be of the "front-projection" type wherein the image is cast on the screen and reflected back to the viewer. Or the screen may be of the "rear projection" type wherein the image is cast upon a rear surface of a translucent material, whereupon the image appears on the front of the screen.

The cabinet design constraints dictated by prior art optical systems have resulted in projection television systems which are massive in size and deep from front to back relative to a conventional console television receiver which utilizes a 25-inch cathode ray picture tube. In addition, projection television systems in general are cumbersome and may require setting up preliminary to operation, a factor that is not appealing to a homeowner accustomed to pressing a single button to activate his familiar console television set.

An example is a two-piece projection television system wherein the projection unit is physically separated from a remotely located viewing screen. FIG. 1 is a simplified schematic of such a system. A television image is formed on the cathodoluminescent screen of a cathode ray tube 1, for example. Projection lens 2, contained in a free-standing cabinet 3 along with cathode ray tube 1, provides for projecting an aerial image of the television image along optical path 4 onto the surface of curvilinear front projection viewing screen 5. The distance between cabinet 3 and screen 5 may exceed eight feet. Preparing the system for operation requires the careful location of cabinet 3, which is usually caster-mounted, in relation to the screen 5. The brightness of screen 5, made curvilinear to focus the image for maximum brightness, diminishes quickly off the screen axis, making it necessary for viewers to cluster closely around the axis in order to see an acceptable picture.

Another basic configuration is a system, shown schematically in FIG. 2, wherein a forwardly tilted, curvilinear, front-projection viewing screen 6, which may be demountable, is mounted uprightly at the back of a cabinet 7. An optical assembly 8, which commonly includes three cathode ray tubes and associated focusing lenses as depicted, is housed in the cabinet 7. The optical assembly 8 casts a plurality of television images on a mirror 9 which, in prepartation for operation, is manually transported on slide means forwardly away from the screen 6 and toward the viewer to a fixed position. The purpose of the mirror 9 is to reflect the images onto the screen where they are brought into coincidence. The necessary projection distance is thus provided. The optical path is noted as being "folded" to provide an optical system that occupies a smaller area, and hence makes possible a smaller cabinet than would otherwise be necessary. The larger the viewing screen, however, the longer the projection optical path and the closer to the viewer the mirror must extend. In one product of this type, for example, wherein the viewing screen is sixty inches in diagonal measure, the mirror is slide-mounted for extension toward the viewer, and the mirror must be transported nearly two feet toward the viewer from the cabinet proper. As a result, the receiver is very deep from front to back during operation. An example of a system of this type is disclosed in U.S. Pat. No. 4,239,894 to Tokumaru et al.

A third representative type of projection television system is a rear-projection system in which the image is projected on the rear of the viewing screen for viewing by an observer located at the front of the screen. An example is the Model PR4800SW projection television receiver manufactured by Quasar Electronics Corp., Franklin Park, Illinois. The system is contained in a single large cabinet the height of a china cabinet. The screen is exposed for viewing by opening the doors of the upper section of the cabinet to reveal a screen of 45-inch diagonal measure. Another example of a television set with a fixed rear projection screen is disclosed in U.S. Pat. No. 4,177,484 to Boje.

In U.S. Pat. No. 3,115,544 to Marley, there are disclosed several configurations of optical system intended to provide a color television receiver of compact dimensions. A receiver having multiple light reflectors common to the converging light paths and position to provide multiple folds in such light paths is shown and described. The receiver further includes beam deflecting means for each of three cathode ray tubes developing a scanning raster whose projected image is pre-distorted by electronic means to provide an undistorted viewing image when the image of off-axis tubes are converged. Magnetic deflection yoke means are relied upon to provide distortion-correction.

OBJECTS OF THE INVENTION

It is a general object of the invention to provide a projection optical system that makes feasible a large screen television receiver having an ultra-compact configuration.

It is a less general object of the invention to provide a projection optical system capable of emerging from and nesting within a cabinet of an ultra-compact large-screen projection television receiver.

It is a more specific object of the invention to provide a projection optical system protractible and retractible within a narrow spatial column.

It is a specific object of the invention to provide a protractible and retractible projection optical system that, when retracted and nested, is overall depth-wise shallow, providing for a receiver as compact as a conventional, large-screen console television receiver.

It is yet another specific object of the invention to provide a protractible and retractible projection optical system that when said system is protracted, remains depth-wise shallow, yet provides for a receiver capable of displaying an image with an area greater than three times the image area of a conventional, large-screen console television receiver.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIGS. 1 and 2 depict schematically the operation of two types of prior art large screen projection television systems;

DESCRIPTION OF THE PREFERRED EMBODIMENT

Figure 3A:
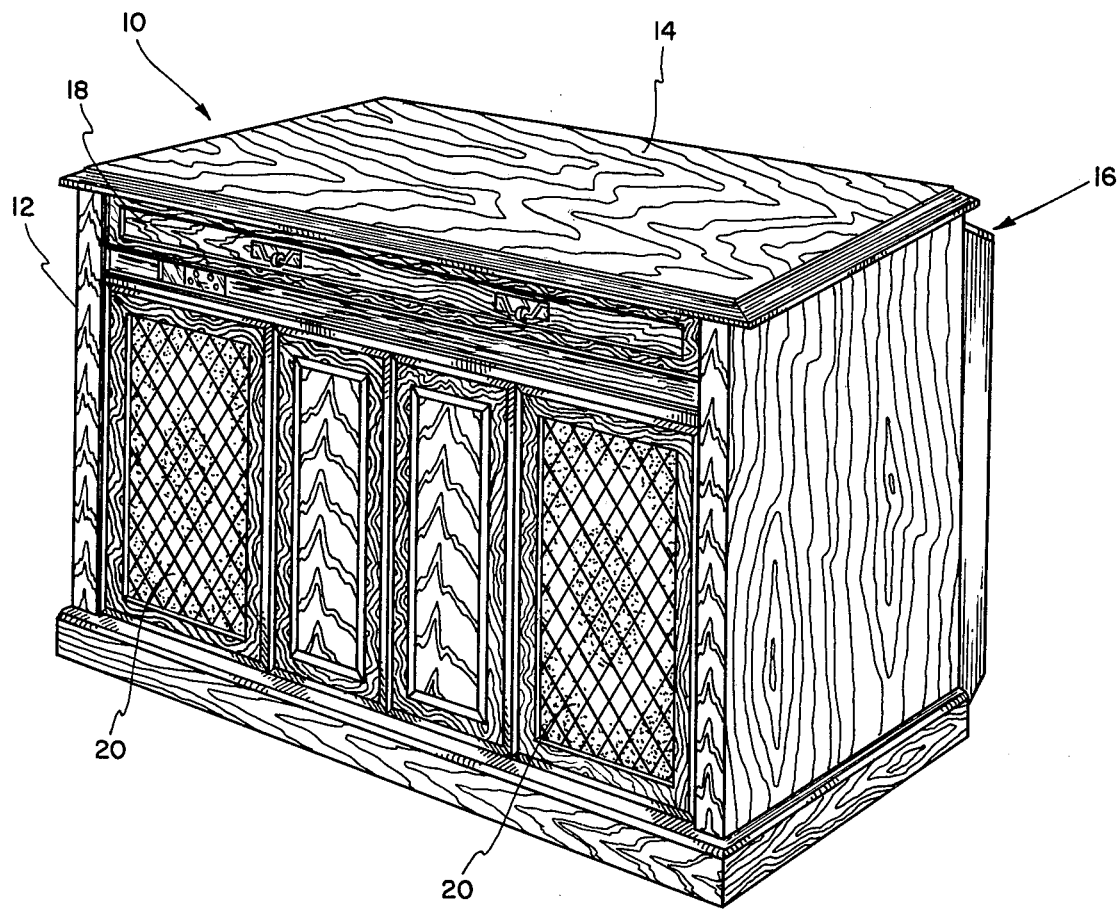
FIGS. 3A and 3B are oblique views in perspective of an ultra-compact projection television receiver having a large screen; There is depicted, respectively, a first, receiver-inoperable position; and a second, receiver-operable position wherein a rear projection screen is elevated from the receiver cabinet for viewing.

An ultra-compact jack-in-the-box projection television receiver 10 according to the invention disclosed in referent copending application Ser. No. 228,434 is shown by FIG. 3A. The projection optical system according to the present invention is applicable to containment in a console receiver of the type indicated, and for emerging from and nesting in the cabinet. The receiver comprises cabinet means 12 for housing the components of the receiver. Cabinet 12 includes lid means 14 attached to the back of the cabinet and pivoted by at least one hinge 16 which may comprise a piano hinge, or a plurality of discrete hinges, for example. The lid 14 may have an overhanging control panel cover 18 for covering a receiver control panel. Grilled aperture ports 20 provide for audio emission from concealed speakers of, for example, a stereo sound system.

Figure 3B:
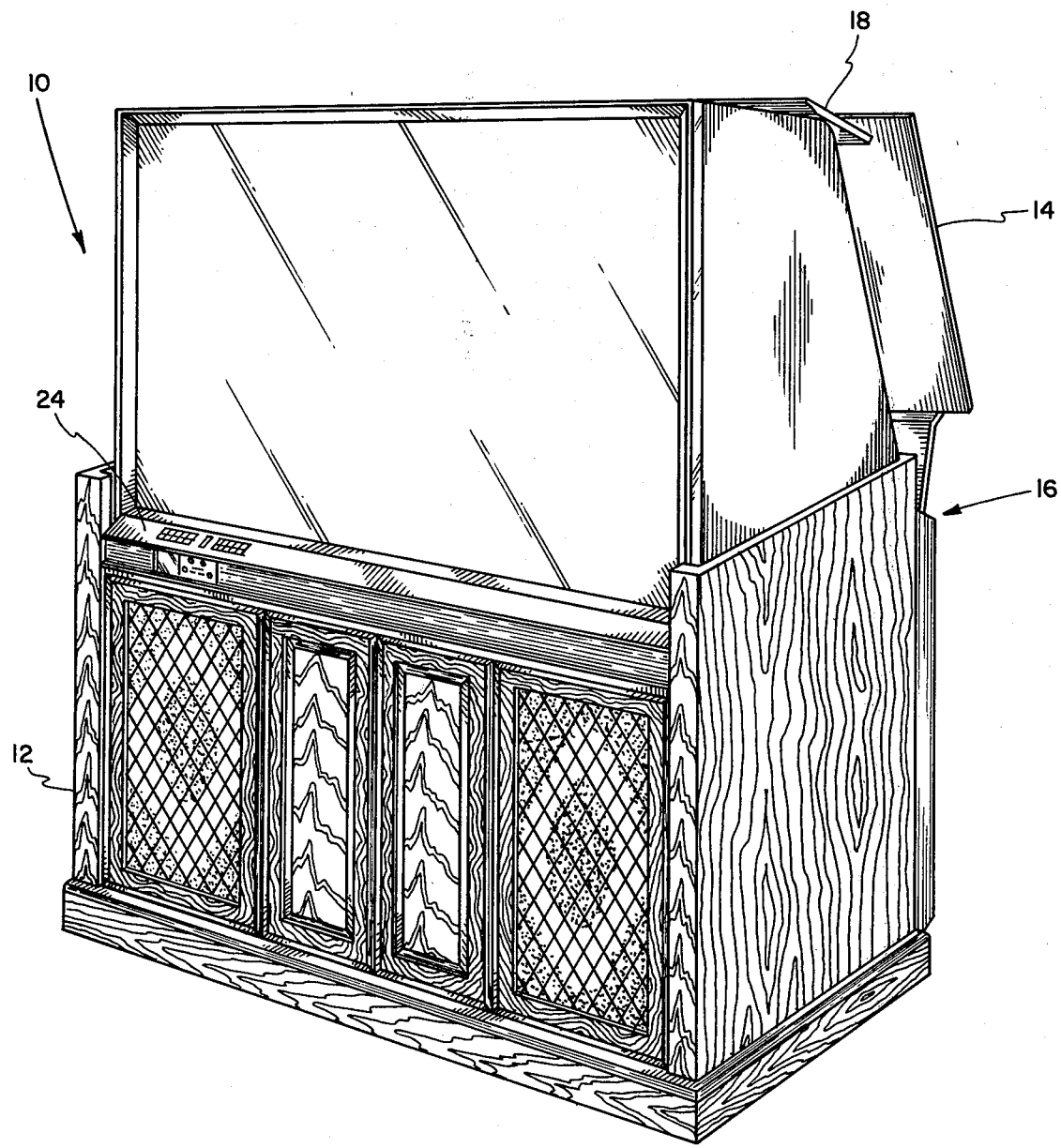

With reference now to FIG. 3B, lid 14 is shown as being raised and components of a projection optical system according to the invention are shown as being emerged from cabinet 12. Control panel 24, which may include all standard front panel controls such as controls for channel selection, audio volume, and various chromatic controls, is exposed by the raising of control panel cover means 18 when lid 14 is raised. Control panel cover 18 may be hingedly dependent from lid 14, as indicated.

Figure 4B:
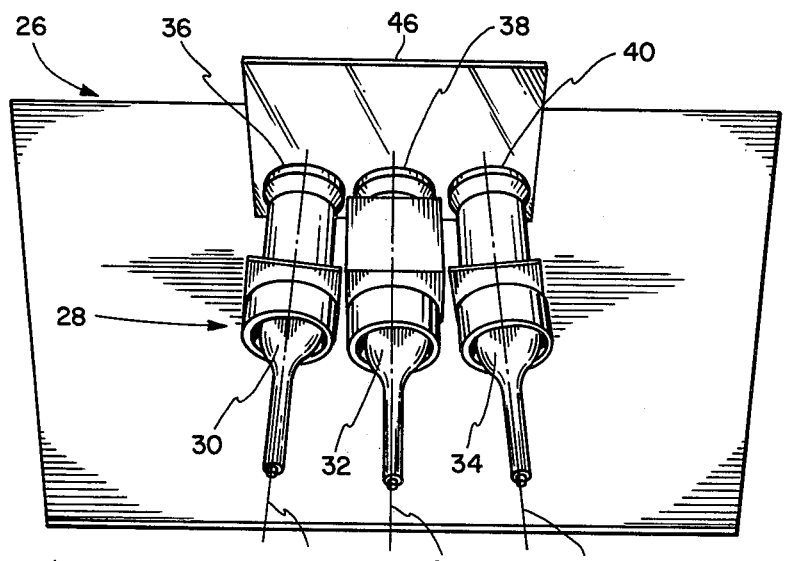
FIG. 4B provides another view in perspective of a major component of the system shown by FIG. 4A.
Figure 4A:
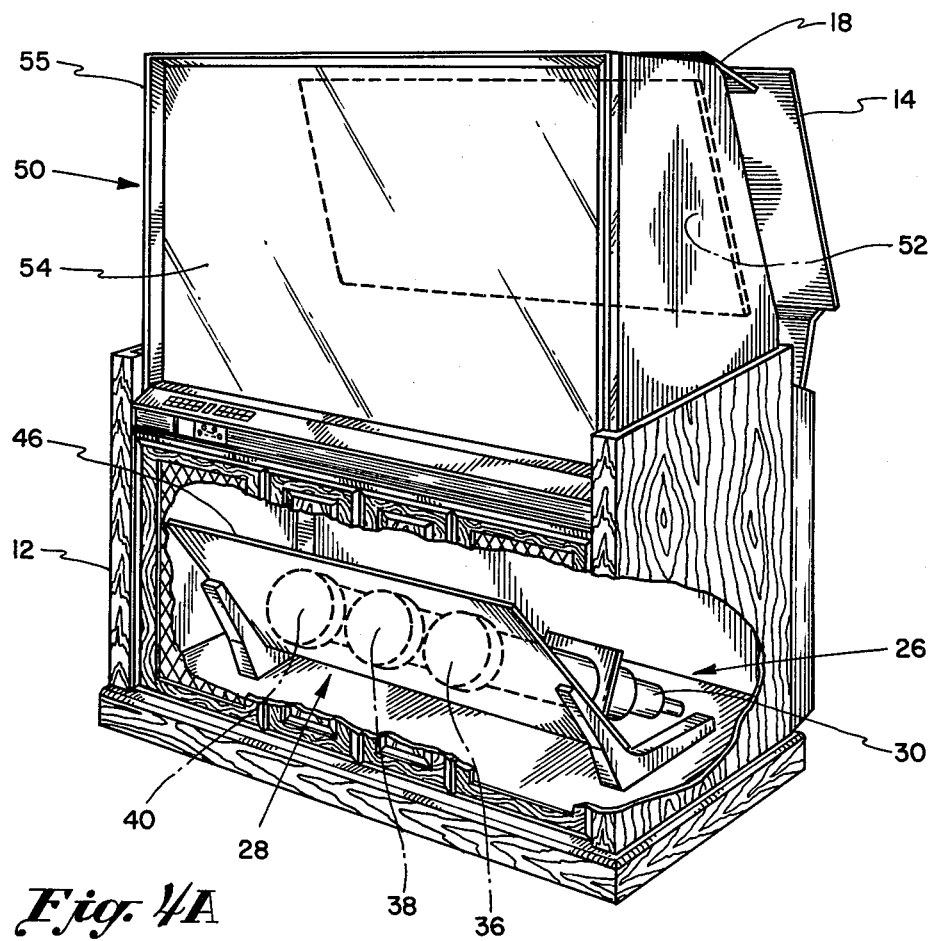
FIG. 4A is an oblique view in perspective depicting a receiver with screen elevated and the receiver cabinet partially cut away to depict the relationship of some of the major components of the projection optical system according to the invention with the cabinet components.

Major components comprising the projection optical system according to the invention are depicted in FIGS. 4A and 4B. A stationary optical assembly 26 is permanently enclosed in a lower portion of cabinet 12, as shown. Stationary optical assembly 26 has an image projection means 28 including at least one cathode ray picture tube, indicated in this embodiment as comprising three tubes 30, 32 and 34 for forming, respectively, and for example, a red image, a green image, and a blue image analogous to a composite color television picture. Each cathode ray tube 30, 32 and 34 has an associated projection lens means 36, 38 and 40. The tubes 30, 32 and 34 and lens means 36, 38 and 40 are on substantially common axes 41, 42 and 44. Lenses 36, 38 and 40 project an aerial image of the television image formed by the associated tube a predetermined image projection distance along an optical path folded by optical path folding means. The respective aerial images are projected into coincidence with the others of the images onto a screen of the rear-projection type, to form the television picture. Stationary optical assembly 26 is fully described and claimed in referent copending application Ser. No. 314,591.

Figure 5A:
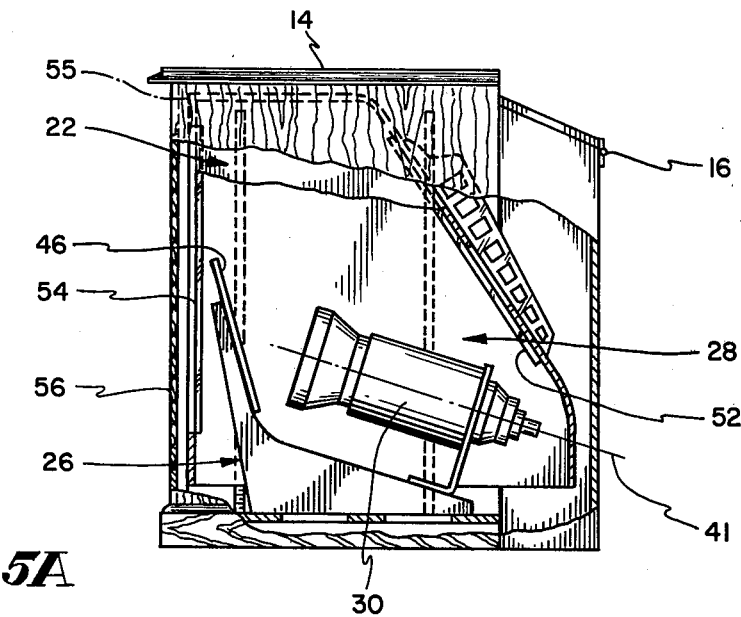
FIGS. 5A and 5B are side views in elevation wherein the receiver cabinet is shown as being cut away to depict additional details of the relationship of components of the projection optical system according to the invention with the cabinet components when the system is, respectively, retracted and protracted.
Figure 5B:
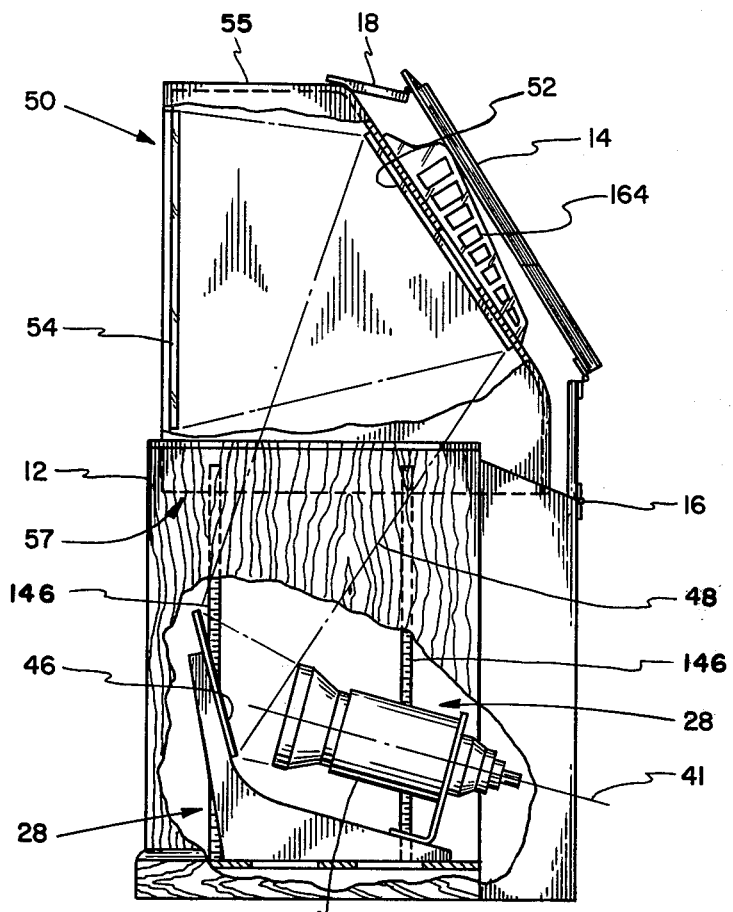

With reference also to FIGS. 5A and 5B, it is to be noted that each of the substantially common axes (41, 42 and 44) is oriented at a common, predetermined, steeply upward projection angle with respect to the horizontal.

The stationary optical assembly 26 also includes first mirror means 46, depicted as being closely adjacent to image projection means 28, that provides for receiving the aforedescribed aerial images. First mirror means 46 is oriented at a predetermined angle effective to reflect the aerial images steeply upwardly along the folded optical path 48 indicated in FIG. 5B.

The projection optical system according to the invention also comprises a protractible optical assembly 50 elevatable as a unit from cabinet means 12, as depicted by FIGS. 4A and 5B. Protractible optical assembly 50 includes second mirror means 52 shown as being located over image projection means 28. Second mirror means 52 provides for receiving the aerial images reflected from first mirror means 46 when the projection optical assembly according to the invention is protracted, and is at a predetermined angle effective to reflect the aerial images forwardly. When the assembly is retracted, the predetermined angle of second mirror means 52 provides for angular conformance with the projection angle of image projection means 28 effective for nesting second mirror means with the image projection means 28.

The protractible optical assembly 50 also includes rear projection screen means 54, shown as being located appreciably forwardly of second mirror means 52. Screen means 54 is also vertically arranged for receiving, when the projection optical system is protracted, the aerial images reflected from second mirror means 52, as depicted in FIG. 5B by the lines defining a folded optical path 48. When the protractible optical assembly 50 is retracted, screen 54 remains vertically arranged for nesting between a front panel 56 of cabinet 12 and first mirror means 46, as depicted in FIG. 5A.

Second mirror 52 and screen 54 are maintained in a predetermined fixed relationship one with the other by shroud means 55. Rigid, box-like shroud 55 has an open front for receiving screen 54, as depicted. Shroud 55 includes a back section slanted at the predetermined angle of mirror 52 for receiving and mounting mirror 52 at the predetermined angle and in open bottom area 57 for access of optical path 48. Shroud 55 is also depicted as having closed sides and a closed top for shielding mirror 52 and the rear surface of screen 54 from ambient light.

Shroud 55 is preferably made of high-impact polystyrene formed in a pressure mold. The material is essentially a "structural foam" that provides strength and rigidity with light weight. The raw color as molded is preferably dark chocolate brown having minimum light reflectivity. The reflectivity may be further reduced by spray-painting the interior with a paint having a matte black finish. The exterior of the shroud may be finished with a texture paint having an appearance compatible with the cabinet 12.

The protractible optical assembly 50, noted as consisting of second mirror 52 and screen 54 is formed into a unitary optical assembly by means of shroud 55. This unitary optical assembly is fully described and claimed in referent copending application Ser. No. 238,861.

Figure 6A:
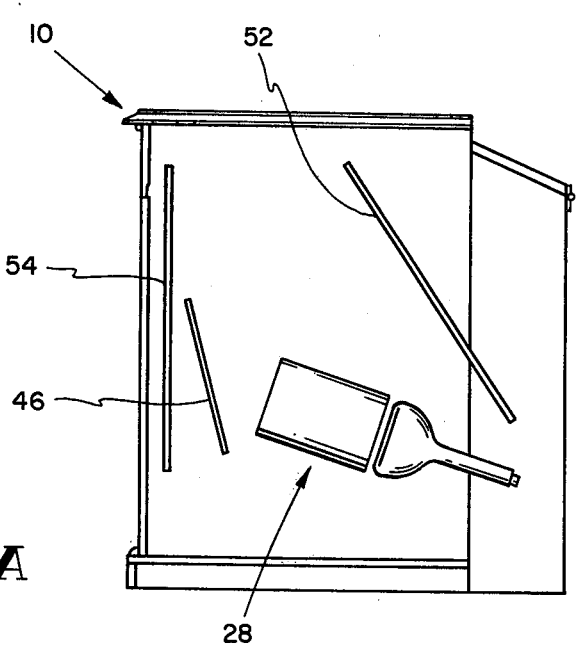
FIG. 6A and 6B are diagrams of the components of the projection optical system according to the invention showing schematically the relationship between components when the system is, respectively, retracted and protracted.

As indicated schematically by FIG. 6A, the projection angle of image projection means 28, and the respective predetermined angles of the first and second mirror means 46 and 52, are such that, when the projection optical system according to the invention is retracted and nested, the system is overall depth-wise-shallow and receiver 10 is as compact as a conventional, large-screen, console television receiver. As indicated by FIG. 6B, when the optical system is protracted within a narrow spatial column 58 for operation, receiver 10 remains depth-wise-shallow, as depicted, yet is capable of displaying an image on screen means 54 with an area greater than three times the image area of the conventional television receiver, which is considered as being about three hundred square inches.

Figure 6B:
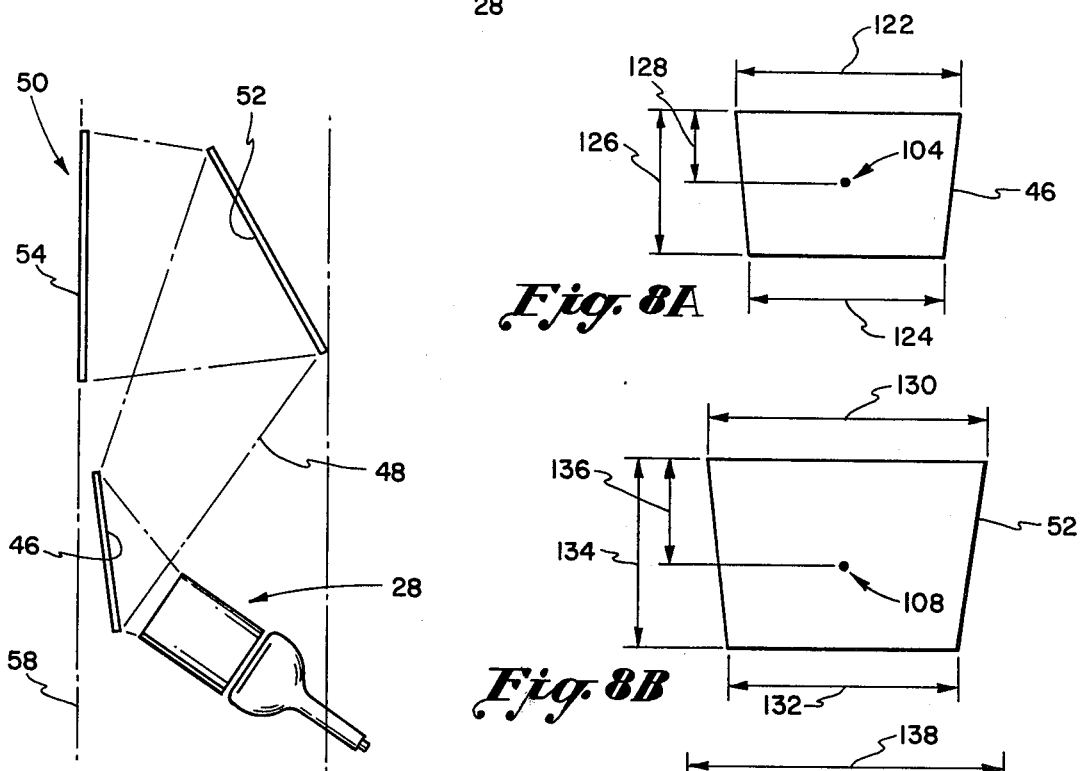
Figure 7A:
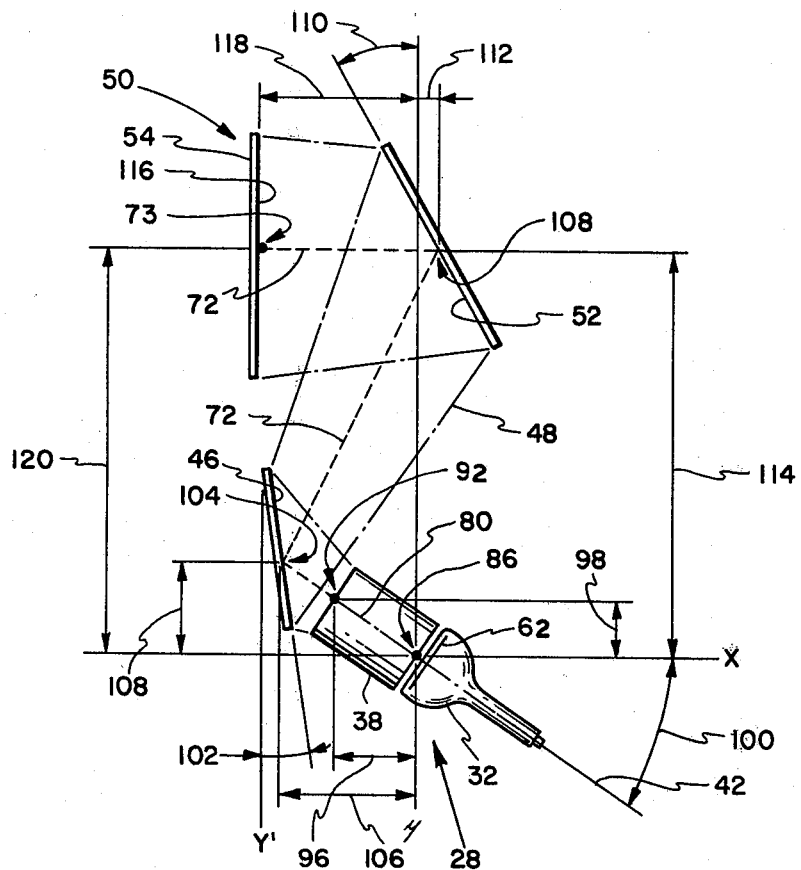
FIG. 7A is a view similar to FIG. 6B, but providing for the description of dimensional and angular parameters.
Figure 7B:
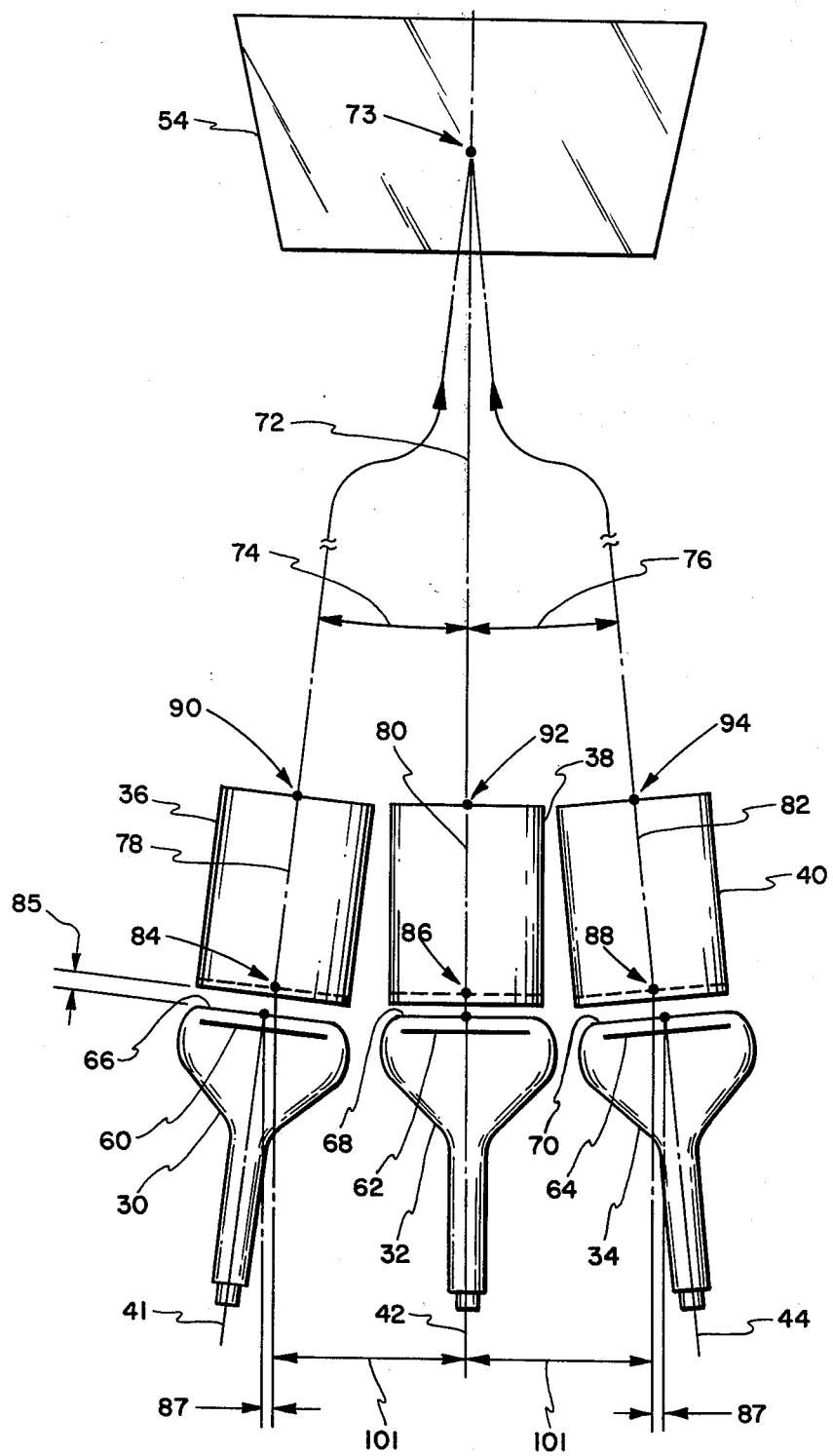
FIG. 7B is a plan view showing diagramatically the angular orientation of certain of the components of the image projection means shown by FIG. 7A.

FIG. 7A is a view similar to that shown by FIG. 6B and is provided for indicating dimensional and angular parameters of the components of the preferred embodiment of the projection optical system according to the invention. FIG. 7B shows diagramatically the angular orientation and dimensional relationship of an image projection means having three cathode ray picture tubes for projecting red, green and blue television images along the folded optical path 48 when the optical system according to the invention is protracted. The folded optical path 48 is, for example, about 58 inches long. With specific reference to FIG. 7B, the three cathode ray tubes 30, 32 and 34 are depicted as being arranged in line. Tubes 30, 32 and 34 are indicated as having cathodoluminescent screens 60, 62 and 64 on the inner surface of the face panels 66, 68 and 70, respectively, for forming respective ones of the television images. The projection optical axis 42 of the center one of the tubes, tube 32, is indicated schematically as being coincident with the axis 72 of screen 54; the image center point 73 of the screen 54 is indicated by the dot symbol. The projection axes 41 and 44 of off-axis tubes 30 and 34 are indicated as being at equal angles 74 and 76, respectively, with regard to axis 72 of screen 54. Angles 74 and 76 may be about five point seven degrees, for example.

The axes 78, 80 and 82 of the projection lenses 36, 38 and 40 have been noted as being "substantially" common to the axes 41, 42 and 44 of the associated tubes. The electron-formed visible images on the cathodoluminescent screens 60 and 64 of tubes 30 and 34, respectively, are caused to have an orientation and non-linear magnification distortion effective to substantially compensate for the off-axis-induced, non-linear magnification distortion of the projected light images; this inventive aspect is fully described and claimed in referent copending application Ser. No. 110,413.

The rear surface of each projection lens 36, 38 and 40; that is the surface nearest the respective associated face panel 66, 68 and 70 is about twelve-hundredths of an inch (ref. No. 85) from the associated face panel, by way of example. The offset of center points 84 and 88 from the center points (also indicated by dots) of the associated face panels 66 and 70 is about two-tenths of an inch (ref. No. 87).

The projection optical system according to the invention is characterized by having the exemplary dimensions and angular parameters set forth in following paragraphs. The parameters apply specifically to the center tube 32 and its associated projection lens 38, although the respective parameters of the off-axis tube-and-lens combination 30/36 and 34/40 are considered as being very similar. With specific reference to FIGS. 7A-B (and to FIGS. 8A-C which show associated components), the dimensional and angular parameters are as measured epicentrically from x (horizontal) and y (vertical) coordinates crossing at the center point 86 of the rear surface of lens 38, and in the plane of the respective projection axis 80 of lens 38. The projection axis 80 of lens 38 is depicted as being coincident with the projection axis of tube 32. With specific reference to FIG. 7A, this "plane" of the projection axis 80 of projection lens 38 can be considered to be as diagramed to depict the folded optical path 48. The center point 92 of the front surface of lens 38, as illustrated for tube 32 and lens 38 in FIG. 7A, is about seven inches (ref. 96) from the y axis and about four point four inches (ref No. 98) from the x axis. The common axis 42/80 is at an angle of about thirty-three degrees (ref. No. 100) with respect to the x axis. The distance between center points 84, 86 and 88 of the rear surfaces of lenses 36, 38 and 40 is about six point eight inches (ref. Nos. 101).

The angle of the face of the first mirror 46 (as measured from y″) is about fourteen degrees (ref. No. 102) with respect to the y axis, and the image center point 104 is about eleven inches (ref. No. 106) from the y axis, and about seven inches ref. No. 108) from the x axis.

Figure 8A:
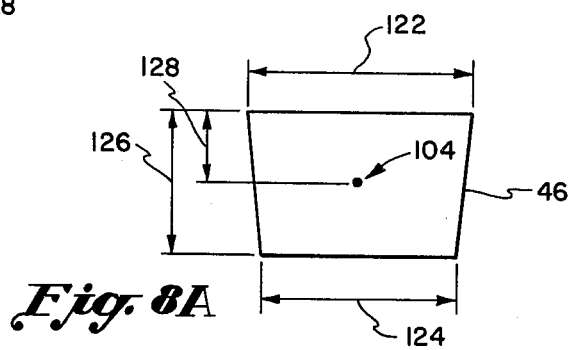
FIGS. 8A–8C are plan views of screen and mirror components of the projection optical system according to the invention providing for the description of dimensional and angular parameters thereof.

(Note: the "image center point" of mirror 46 is considered for exemplary purposes to be as indicated by reference No. 104 in FIG. 8A, and by reference No. 108 for mirror 52. The image center point is the point at which the projection optical axis 72 of the center tube-and lens 32/38 impinges on the surface of the respective mirror.)

The angle of the surface of second mirror 52 is about thirty-one degrees (ref. No. 110) with respect to the y axis, and the image center point 108 is about three inches (ref. No. 112) from the y axis as measured from the inner surface 116 and about thirty-two inches (ref. No. 114) from the x axis.

The angle of screen 54 is about zero degrees with respect to the y axis, as will be seen in FIG. 7A, and its image center point 73 is about fourteen inches (ref. No. 118) from the y axis as measured from the inner surface 116, and about thirty-two inches (ref. No. 120) from the x axis.

Figure 8B:
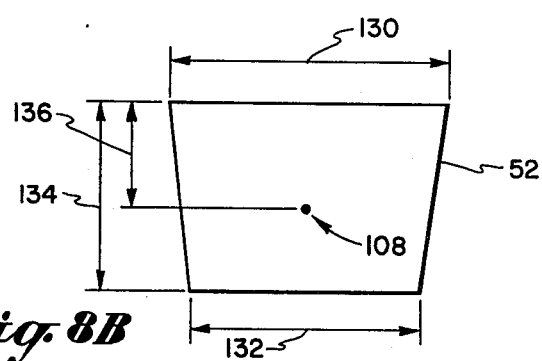

With reference now to FIG. 8A and 8B which schematically depict, respectively, first mirror 46 and second mirror 52, there are indicated exemplary dimensions as follows: The mirrors are preferably of trapezoidal shape, as indicated. First mirror 46 is about twenty-one inches in width (ref. No. 122) at the top, and about eighteen inches (ref. No. 124) at the bottom. The height of mirror 46 is about twelve inches (ref. No. 126) and the dimension from the top of the mirror to the image center point 104 is about seven point four inches ref. No. 128).

The top width dimension of second mirror 52 is about thirty-three inches (ref. No. 130) and the bottom width dimension is about twenty-eight point six inches (ref. No. 132). The height of second mirror 52 is about twenty-one inches (ref. No. 134) and the dimensions from the top to the image center point 108 is about twelve inches (ref. No. 136).

Figure 8C:
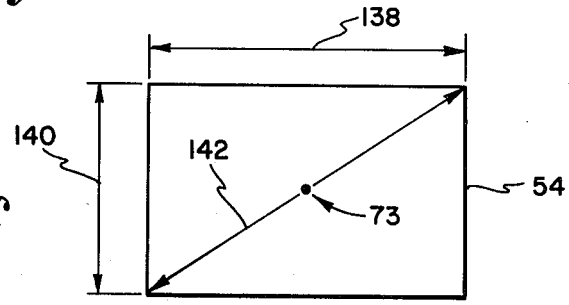

Screen 54, also shown by FIG. 8C, has a width of about thirty-six inches (ref. no. 138), and a height of about twenty-seven inches (ref. No. 140). Diagonal measure is about forty-five inches (ref. No. 142). Screen area is about nine-hundred and seventy-one square inches, an area greater than three times the image area of the conventional large-screen console television receiver utilizing a cathode ray tube of twenty-five inch diagonal measure.

Mirrors 46 and 52 are preferably front-coated float glass having an aluminized surface enhancement-coated to ninety-four percent or greater reflectivity as measured with a Viscor filter and a Weston photocell at an angle of incidence of twenty-two point five degrees. Flatness is 20/20 fringes as measured using a Davidson Fizeau interferometer with a two-inch diameter aperture. Flatness is expressed in fringes of power/irregularity.

Screen 54 is preferably of the rear projection type as manufactured by Optical Sciences Group, San Rafael, California, and designated as type 192–679. An equivalent supplied by another manufacturer may as well be used. Screen 54 is preferably made of acrylic and has a lenticular surface on the inner side, and a fresnel surface facing the television receiver used.

Figure 9:
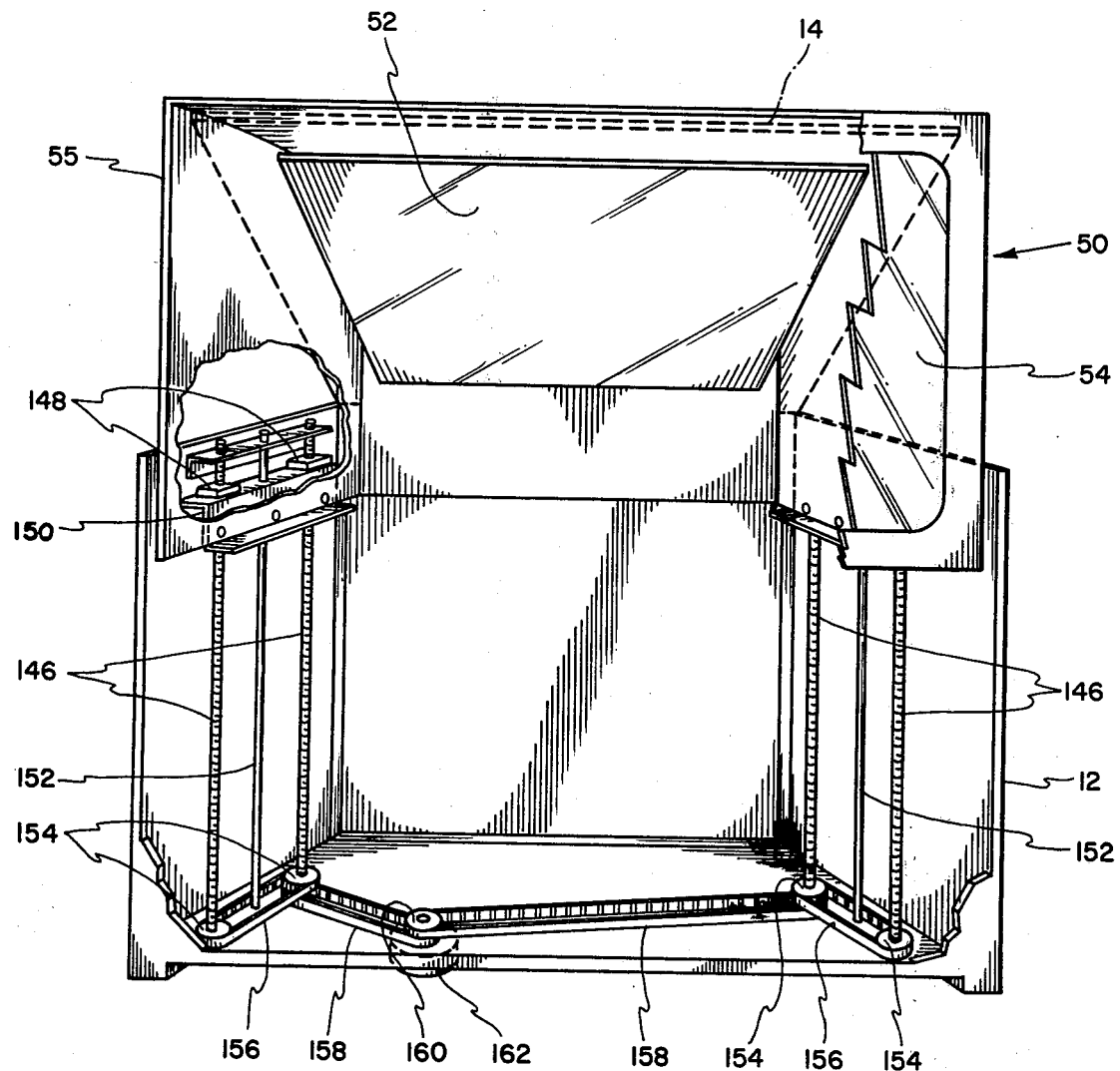
FIG. 9 is a perspective view of a projection television receiver with the cabinet front and the screen cut away to show details of a means for protracting and retracting the projection optical system according to the invention.

FIG. 9 depicts means for lifting lid 14 (indicated by the dash lines) and protracting the protractible optical assembly 50 from a first, receiver-inoperable position wherein screen 54 is stored and nested in cabinet 12, to a second receiver-operable position wherein screen 54 is emerged from cabinet 12. As noted, shroud 55 provides for maintaining second mirror 52 and screen 54 in a predetermined fixed relationship. Four vertically oriented and vertically stabilized screw means 146, for example, are indicated as providing for protracting and retracting the protractible optical assembly 50 to elevate and lower screen 54. Shroud 55 is shown as cut away in the left-hand side of FIG. 9 to show details of the elevating means; an identical mirror image assembly is located on the opposite side of the cabinet 12, but obscured by screen 54.

The rotation of screw means 146 is translated into vertical movement by screw follower means 148 attached to bracket 150, to which shroud 55 is in turn attached. Guide rods 152 provide for vertically stabilizing shroud 55 in its vertical traverse. Screen 54 is depicted as being in its emerged position.

Screw means 146 are caused to rotate in unison by power train means indicated as comprising screw means drive pulleys 154 which are caused to rotate in unison by drive pulley link belts 156. Drive pulleys are in turn linked by belts 158 to drive pulleys 160 which are rotated by a reversible electrical motor 162. Belts 156 and 158 are depicted as being of the synchronous type for mating with synchronous pulleys 154 and 160, providing positive drive. The precision elevating means are fully described and claimed in the referent copending application Ser. No. 235,059.

The precision elevating means also provides for raising and lowering lid 14. A track 164 (please refer to FIG. 5B) is located on the outside surface of the shroud 55. A track-follower means (not shown) is attached to the inner surface of lid 14. As shroud 55 is elevated and lowered, the track follower rides on the track 164 so that there is no friction between lid 14 and shroud 55 during elevating and lowering of the protractible optical assembly 22. Also, the lid lifting means prevents the lid 14 from falling backwards as the shroud 55 is elevated. Further, the track 164 is contoured to provide an initial quick rise of the lid as the screen emerges from the cabinet 12.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. For use in an ultra-compact, rear-projection television receiver, a projection optical system protractible and retractible within a narrow spatial column for emerging from and nesting within a cabinet of said receiver, said optical system comprising in combination:
   a stationary optical assembly permanently enclosed in
      a lower portion of said cabinet, said assembly having:

image projection means including at least one cathode ray tube means for forming a television image, and having associated projection lens means on a common axis therewith for projecting an aerial image of said television image a predetermined image projection distance along an optical path folded by optical path folding means, said common axis being oriented at a predetermined, steeply upward projection angle; and first mirror means mounted closely adjacent to said image projection means for receiving said aerial image, said first mirror being oriented at a fixed predetermined first mirror reflection angle effective to reflect said aerial image steeply upwardly along said folded optical path;

a protractible optical assembly elevatable as a unit from said cabinet including:

second mirror means located over said image projection means for receiving said aerial image reflected from said first mirror means when said protractible optical assembly is protracted, said second mirror means being oriented at a fixed predetermined second mirror reflection angle effective to reflect said aerial image forwardly, and when said protractible optical assembly is retracted, said predetermined second mirror reflection angle provides for angular conformance with said projection angle of said image projection means effectively permitting nesting of said second mirror with said image projection means;

rear projection screen means located appreciably forwardly of said second mirror means and vertically arranged for receiving, when said protractible optical assembly is protracted, said aerial image reflected from said second mirror means, and when said protractible optical assembly is retracted, said screen means is vertically arranged for nesting between a front panel of said cabinet and said first mirror means;

said projection angle of said image projection means, and said predetermined first and second mirror reflection angles being such that said protractible optical assembly, when retracted and nested, is overall depth-wise-shallow, and said receiver is as compact as a conventional, large-screen console television receiver, and when said protractible optical assembly is protracted within said narrow spatial column, said receiver remains depth-wise-shallow, yet is capable of displaying an image with an area greater than three times the image area of said conventional television receiver.

2. A projection optical system as set forth in claim 1 in which:

said common axis of said image projection means is oriented at an upward projection angle of about thirty-three degrees with respect to the horizontal, said first mirror means is oriented at about fourteen degrees with respect to the vertical, and said second mirror means is oriented at about thirty-one degrees with respect to the vertical.

3. For use in an ultra-compact, rear-projection television receiver, a projection optical system protractible and retractible within a narrow spatial column for emerging from and nesting within a cabinet of said receiver, said optical system comprising in combination:

a stationary optical assembly permanently enclosed in a lower portion of said cabinet, said assembly including:

image projection means including three cathode ray picture tubes for forming, respectively, a red image, a green image, and a blue image analagous to a composite color television picture, each tube having associated projection lens means in a substantially common axis therewith for projecting an aerial image a predetermined image projection distance along an optical path folded by optical path folding means into coincidence with others of said images to form said color television picture, each of said common axes being oriented at a common, predetermined, steeply upward projection angle;

first mirror means mounted closely adjacent to said image projection means for receiving said aerial images, said first mirror means being oriented at a fixed predetermined first mirror reflection angle effective to reflect said aerial images steeply upwardly along said folded optical path;

a protractible optical assembly elevatable as a unit from said cabinet including:

second mirror means located over said image projection means for receiving said aerial images reflected from said first mirror means when said protractible optical assembly is protracted, said second mirror means being at a fixed predetermined second mirror reflection angle effective to reflect said aerial images forwardly, and when said protractible optical assembly is retracted, said predetermined second mirror reflection angle provides for angular conformance with said projection angle of said image projection means effectively permitting nesting of said second mirror means with said image projection means;

rear projection screen means, said screen means being located appreciably forwardly of said second mirror means and vertically arranged for receiving, when said protractible optical assembly is protracted, said aerial images reflected from said second mirror means, and when said protractible optical assembly is retracted, said screen means is vertically arranged for nesting between a front panel of said cabinet and said first mirror means;

said projection angle of said image projection means, and said predetermined first and second mirror reflection angles being such that said protractible optical assembly, when retracted and nested, is overall depth-wise-shallow, and said receiver is as compact as a conventional, large-screen console television receiver, and when said protractible optical assembly is protracted within said narrow spatial column for operation, said receiver remains depth-wise-shallow, yet is capable of displaying an image with an area greater than three times the image area of said conventional console television receiver.

4. In an ultra-compact, rear projection television receiver having a projection optical system protractible and retractible within a narrow spatial column for emerging from and nesting within a cabinet of said receiver, said optical system providing for projecting, when protracted, at least one television image along a folded optical path folded by optical path folding means onto a rear projection screen of said receiver, said optical system including at least one cathode ray picture tube permanently enclosed in a lower portion of said cabinet and having a cathodoluminescent screen on the inner surface of its face panel for forming said television image, said tube having associated projection lens means on a common axis therewith, said projection, lens having a front face and a rear face located about twelve-hundredths of an inch from said face panel of said tube, said projection lens providing for projecting an aerial image of said television image a predetermined image projection distance of about fifty-eight inches along said optical path and onto said rear projection screen, said path including a first mirror and a second mirror for sequentially reflecting said image along said optical path into coincidence on said rear projection screen, said receiver being characterized by the components of said optical system having the following dimensional and angular parameters, as measured epicentrally from or with respect to x (horizontal) and y (vertical) coordinates crossing at the center point of said rear face of said projection lens, and in the plane of the projection axis of said lens:

(a) the center point of the front surface of said projection lens being about seven inches from the y axis, and about four point four inches from the x axis, and with said common axis being at an angle of about thirty-three degrees with respect to the x axis;

(b) the angle of the face of said first mirror being about fourteen degrees with respect to the y axis, and with the image center point being about eleven inches from the y axis, and about seven inches from the x axis;

(c) the angle of the face of said second mirror being about thirty-one degrees with respect to the y axis, and with the image center point being about three inches from the y axis and about thirty-two inches from the x axis;

(d) the angle of said rear projection screen being about zero degrees with respect to the y axis, and with its image center point being about 14 inches from the y axis, and about thirty-two inches from the x axis.

5. In an ultra-compact projection television receiver having a projection optical system protractible and retractible within a narrow spatial column and selectively storable in a cabinet of said receiver for projecting when protracted, red, green and blue television images along a folded optical path about fifty-eight inches in length into coincidence on a rear projection screen, said projection optical system including three cathode ray picture tubes arranged in line and permanently stored in a lower portion of said cabinet, each with a cathodoluminescent screen on the inner surface of its face panel for forming one of said television images, with the projection axis of the center one of said tubes being coincident with the axis of said screen, and the projection axis of each off-axis tube being at an angle of about five point seven degrees with respect to said axis of said screen, each of said tubes having an associated projection lens on a substantially common axis therewith including a front face and a rear face about twelve-hundredths of an inch from the associated face panel, said projection lenses providing for projecting aerial images of the television images formed by said tubes along said folded optical path, said path including a first mirror and a second mirror for sequentially reflecting said aerial images along said optical path into coincidence on said rear projection screen, said projection, television receiver being characterized by said projection optical system having the following dimensional or angular parameters, as measured epicentrally from with respect to x (horizontal) and y (vertical) coordinates crossing at the center point of the rear surface of the lens for the center one of said tube, and in the plane of the respective projection axis of said lens:

(a) the center point of the front surface of said projection lens being about seven includes from the y axis, and about four point four inches from the x axis, and with said common axis being at an angle of about thirty-three degrees with respect to the x axis;

(b) the angle of the face of the first mirror being about fourteen degrees with respect to the y axis, and with the image center point being about seven inches from the x axis;

(c) the angle of the face of said second mirror being about thirty-one degrees with respect to the y axis, and with the image center point being about three inches from the y axis and about thirty-two inches from the x axis;

(d) the angle of said rear projection screen being about zero degrees with respect to the y axis, and with its image center point being about fourteen inches from the y axis, and about thirty-two inches from the x axis.

6. In an ultra-compact projection television receiver having a projection optical system protractible and retractible within a narrow spatial column and selectively storable in a cabinet of said receiver for projecting when protracted, red, green and blue television images along a folded optical path about fifty-eight inches in length into coincidence on a rear projection screen, said projection optical system including three cathode ray picture tubes arranged in line and permanently stored in a lower portion of said cabinet, each with a cathodoluminescent screen on the inner surface of its face panel for forming one of said television images, with the projection axis of the center one of said tubes being coincident with the axis of said screen, and the projection axis of each off-axis tube being at an angle of about five point seven degrees with respect to said axis of said screen, each of said tubes having an associated projection lens on a substantially common axis therewith including a front face and a rear face about twelve-hundredths of an inch from the associated face panel, said projection lenses providing for projecting aerial images of the television images formed by said tubes along said folded optical path, said path including a first mirror and a second mirror for sequentially reflecting said aerial images along said optical path also coincidence on said rear projection screen, said projection television receiver being characterized by said projection optical system having the following dimensional or angular parameters, as measured epicentrally from or with respect to x (horizontal) and y (vertical) coordinates crossing at the center point of the rear surface of the lens for the center one of said tubes, and in the plane of the respective projection axis of each lens:

(a) the center point of the front surface of the center one of said projection lenses being about seven inches from the y axis, and about four point four inches from the x axis, and with said common axis being at an angle of about thirty-three degrees with respect to the x axis;

(b) the angle of the face of the first mirror being about fourteen degrees with respect to the y axis, and with the image center point being about eleven inches from the y axis, and about seven inches from the x axis;

(c) the angle of the surface of said second mirror being about thirty-one degrees with respect to the y axis, and with the image center point being about three inches from the y axis and about thirty-two inches from the x axis;

(d) the angle of said rear projection screen being about zero degrees with respect to the y axis, and with its image center point being about fourteen inches from the y axis, and about thirty-two inches from the x axis.

7. A method for providing a projection optical system protractible within a narrow spatial column for emerging from the cabinet of an ultra-compact, rear-projection television receiver for receiver operation, and retractible and nestable within the cabinet for storing, the method comprising:

permanently enclosing a stationary optical assembly in a lower portion of said cabinet;

including image projection means in said stationary optical assembly, said image projection means having at least one cathode ray tube means for forming a television image;

associating with said cathode ray tube means, and on a common projection axis therewith, projection lens means for projecting an aerial image of said television image along a folded optical path formed by optical path folding means when said optical system is protracted;

orienting said projection axis of said image projection means steeply upwardly;

providing first mirror means closely adjacent to said image projection means for receiving said aerial image;

nearly-vertically orienting said first mirror means to provide a first mirror angle effective to reflect said aerial image steeply upwardly;

providing second mirror means at an angle in substantial conformance with the projection axis of said image projection means, and effective to reflect said aerial image forwardly;

vertically arranging rear projection screen means appreciably forward of said second mirror means for receiving and displaying said aerial image;

such that when said optical system is protracted, said steeply upward projection angle of said image projection means said first mirror angle, and said angle of said second mirror provide for containment of said optical system in said narrow spatial column, and when said optical system is retracted, the angular conformance of said second mirror means with said image projection means provides for nesting therewith, and the vertical orientation and forward location of said screen provides for the nesting of said screen means with said near-vertically oriented first mirror means.

8. A method for providing a projection optical system protractible within a narrow spatial column for emerging from the cabinet of an ultra-compact, rear-projection television receiver for receiver operation, and retractible and nestable within the cabinet for storing, the method comprising:

permanently enclosing a stationary optical assembly in a lower portion of said cabinet;

including image projection means in said stationary optical assembly, said image projection means including three cathode ray picture tubes for forming, respectively, a red image, a green image, and a blue image;

associating with each of said tubes, and on a substantially common projection axis therewith, projection lens means for projecting aerial images of said red, green and blue images along a folded optical path folding means when said optical system is protracted;

orienting said projection axes of said image projection means steeply upwardly;

providing first mirror means closely adjacent to said image source means for receiving said aerial images;

nearly-vertically orienting said first mirror means to provide a first mirror angle effective to reflect said aerial images steeply upwardly;

providing second mirror means for receiving said aerial images reflected from said first mirror means, and locating said mirror means over said image projection means;

orienting said second mirror means at an angle in substantial conformance with the projection axes of said image projection means, and effective to reflect said aerial images forwardly;

vertically arranging a rear projection screen means appreciably forward of said second mirror means for receiving and displaying in coincidence with aerial images;

such that when said optical system is protracted, said steeply upward projection angle of said image projection means said first mirror angle, and said angle of said second mirror provide for containment of said optical system in said narrow spatial column, and when said optical system is retracted, the angular conformance of said second mirror means with said image projection means provides for nesting therewith, and the vertical orientation and forward location of said screen means provides for the nesting of said screen means with said near-vertically oriented first mirror means.

9. A method for providing a projection optical system protractible within a narrow spatial column for emerging from the cabinet of an ultra-compact, rear-projection television receiver for receiver operation, and retractible and nestable within the cabinet for storing, the method comprising:

permanently enclosing a stationary optical assembly in a lower portion of said cabinet;

including image projection means in said stationary optical assembly, said image projection means including three cathode ray picture tubes for forming, respectively, a red image, a green image, and a blue image;

associating with each of said tubes and on a substantially common projection axis therewith, projection lens means for projecting aerial images of said red, green and blue images along a folded optical path formed by optical path folding means when said optical system is protracted;

orienting said projection axes of said image projection means at an upward projection angle of about thirty-three degrees with respect to the horizontal;

providing first mirror means closely adjacent to said image projection means for receiving said aerial images;

orienting said first mirror means to provide a first mirror angle effective to reflect said aerial images steeply upwardly, said angle being about fourteen degrees with respect to the vertical;

providing second mirror means for receiving said aerial images reflected from said first mirror means, and locating said mirror means over said image projection means;

orienting said second mirror means at an angle in substantial conformance with the projection axes of said image projection means, and effective to reflect said aerial images forwardly, said angle being about thirty-one degrees with respect to the horizontal;

vertically arranging a rear projection screen means appreciably forward of said second mirror means for receiving and displaying in coincidence said aerial images;

such that when said optical system is protracted, said steeply upward projection angle of said image projection means said first mirror angle, and said angle of said second mirror provide for containment of said optical system said narrow spatial column, and when said optical system is retracted, the angular conformance of said second mirror means with said image projection means provides for nesting therewith, and the vertical orientation and forward location of said screen means provides for the nesting of said screen means with said near-vertically oriented first mirror means.

* * * * *